Feb. 3, 1970  M. A. MARRONI ET AL  3,492,672
PRESSURE GARMENT JOINT
Filed Oct. 7, 1966  2 Sheets-Sheet 1

INVENTORS
MICHAEL A. MARRONI
DOUGLAS E. GETCHELL
JOHN J. KORABOWSKI
BY Norman Friedland
ATTORNEY

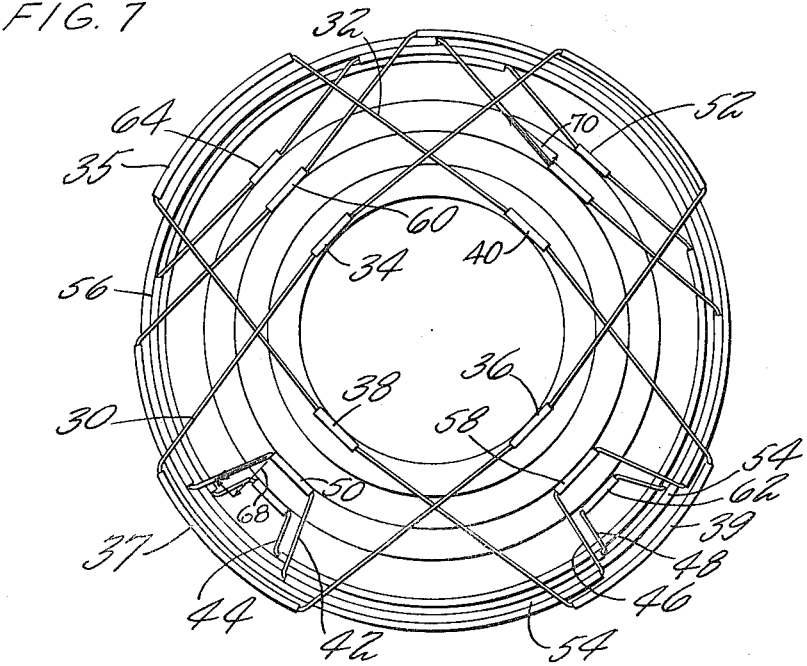
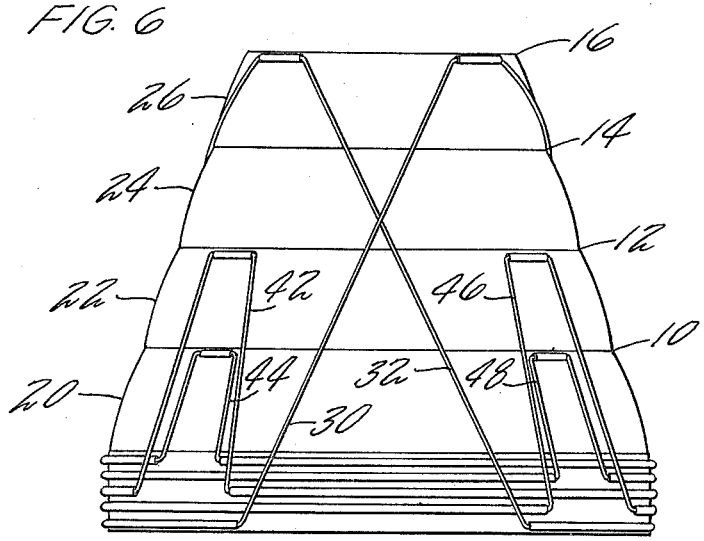

United States Patent Office 3,492,672
Patented Feb. 3, 1970

---

3,492,672
PRESSURE GARMENT JOINT
Michael A. Marroni, San Jose, Calif., Douglas E. Getchell, Windsor Locks, Conn., and John J. Korabowski, Wilbraham, Mass., assignors, by mesne assignments, to the United States of America as represented by the Administrator of the National Aeronautics and Space Administration
Filed Oct. 7, 1966, Ser. No. 586,330
Int. Cl. B63c 11/04
U.S. Cl. 2—2.1     1 Claim

ABSTRACT OF THE DISCLOSURE

A universal joint for a pressurized space suit consisting of a plurality of cables slideably mounted in ferrules attached to the fabric of the suit.

---

The invention described herein was made in the performance of work under a NASA contract and is subject to the provisions of Section 305 of the National Aeronautics and Space Act of 1958, Public Law 85–568 (72 Stat. 435; 42 U.S.C. 2457).

This invention relates to joints for pressure suits and particularly to omnidirectional joints which are made from "soft" or nonrigid materials.

Pressurized suits designed for space or high altitude aircraft use must have flexible joints corresponding to the human joints of the wearer to permit freedom of movement of the body and limbs. These joints should be relatively easy to move, should allow a sufficient degree of freedom, and should conform to the human anatomy so as to prevent pressure points from developing when the suit is inflated. A pressure point being an irritating local contact between an inflated pressure garment and the subject wearing the suit.

Generally speaking most human joints do not move in a symmetrical fashion about a straight neutral axis through the joint. The elbow joint can be bent inward, but cannot be bent very far in the opening direction. The shoulder joint can be moved very far in the forward direction, but the movement rearward is limited. Because of these characteristics it is desirable to provide pressure suit joints in which the mobility of the joint may be unequal on different sides of the neutral axis through the joint. Given a particular range of mobility it is often desirable to locate this range other than symmetrically about the neutral axis of a joint.

Our invention provides a bias on an otherwise symmetrical joint so as to provide more mobility in some directions from the neutral axis than in others.

It is an object of this invention to provide an omnidirectional joint for a pressure suit.

It is a further object of this invention to provide an omnidirectional flexible suit joint which can be moved relatively easily and which is stable in any position.

It is a further object of this invention to provide an omnidirectional joint for a pressure suit which is twistable.

It is a further object of this invention to provide a pressure suit joint which is completely soft in the unpressurized condition.

It is a further object of this invention to provide a pressure suit joint having a greater degree of mobility in particular directions.

It is a further object of this invention to provide a "soft" shoulder joint for a pressure suit which will allow the subject wearing the suit to place his arms at his side.

Figure 1:
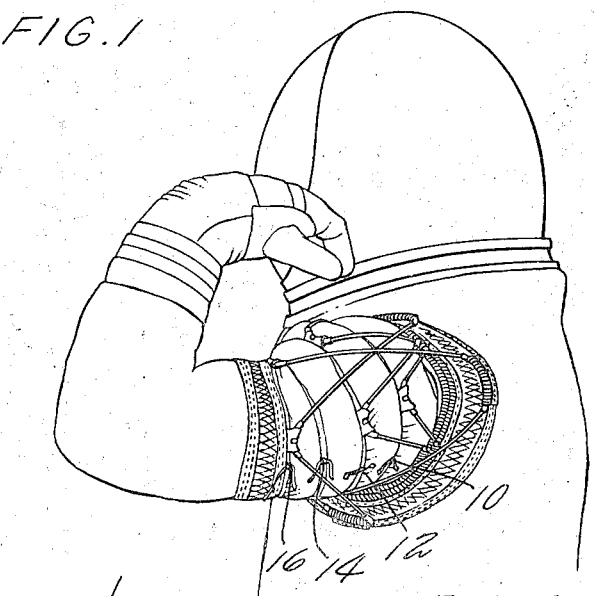
FIGURE 1 is a pictorial representation of a pressure suit which embodies our invention.
Figure 3:
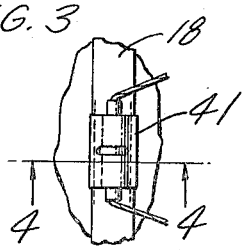

FIGURE 3 in an enlarged view of one of the cord guide members shown in FIGURE 1.

Figure 4:
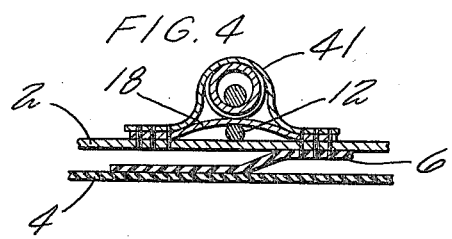

FIGURE 4 is a section taken through 4—4 of FIGURE 3.

Figure 5:
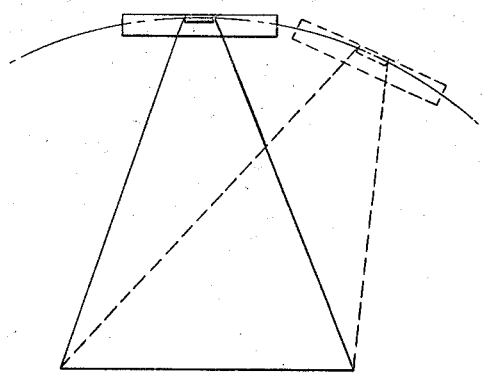

FIGURE 5 is a schematic showing the movement of convolute 26 shown in FIGURE 6.

FIGURE 6 is a simplified schematic side view of the shoulder joint shown in FIGURE 1.

FIGURE 7 is a top view of FIGURE 6.

Details of the construction of this type of joint can be obtained from U.S. patent application Ser. No. 586,329, filed on the same date as this application, entitled, "Omnidirectional Joint," and invented by M. Marroni, J. Hardy, and M. Baker.

Although our invention is shown embodied in a shoulder joint it should be realized that it can be utilized in any joint in which it is desired to bias the mobility range of the joint in particular directions. The joint includes a flexible tapered tubular fabric member 2 and a slightly larger gas impervious tubular bladder member 4 which is designed to retain a gas within the suit. The inner bladder is slightly larger than the outer fabric 2 so as to prevent stretching of the inner bladder when the suit is inflated. Short tubular tapes 6 have one end cemented to the bladder and the other end sewn to the fabric tube so as to limit relative movement between the bladder and the fabric. A series of circumferential restraint cords 10, 12, 14 and 16 are axially spaced along the tube. These cords are held in their axial position by tunnel tapes 18 which are sewn to the outside of the fabric. The ends of the circumferential restraint cords extend through holes in the tunnel tape and can be tied so as to locally reduce the diameter of the tube, thereby creating a series of convolutes 20, 22, 24 and 26 along the length of the tube. The reduced diameter portions of the tube between convolutes are called convolute roots.

What has been described so far is a tubular member which is restrained only in a circumferential direction. Without any additional restraints the tube when inflated as part of a space suit will become elongated to its maximum length and the fabric would be under high loads. To limit the axial loading of the fabric and to reduce the length of the joint to somewhat less than its maximum so as to maintain the convoluted form the axial restraint system described below is applied to the joint. The main load tending to extend the joint in an axial direction, sometimes referred to as the plug load, is taken by cords 30 and 32 which are laced between the last convolute root and the base end of the shoulder. These cords pass through low friction ferrules 34, 36, 38 and 40 which are attached to the fourth convolute root by fabric retaining members 41. At the base of the shoulder they pass through somewhat longer low friction tubular members, as shown. The first and second convolute roots are restrained by the restraint cords 42, 44, 46 and 48 while the third convolute root is unrestrained. This is done to encourage bending at the base of the joint so as to conform more to the natural bend of the human shoulder. Control of the third convolute root is unnecessary since there is a natural tendency for a joint of this geometry to bend near the smaller end.

FIGURE 5 shows the limitations on the movement of convolute 26 as the shoulder is bent. There is a tendency for the ferrules 34, 36, 38 and 40 to move along the cords while the cords 30 and 32 remain stationary this minimizes the frictional effects during movement of the joint.

Figure 2:
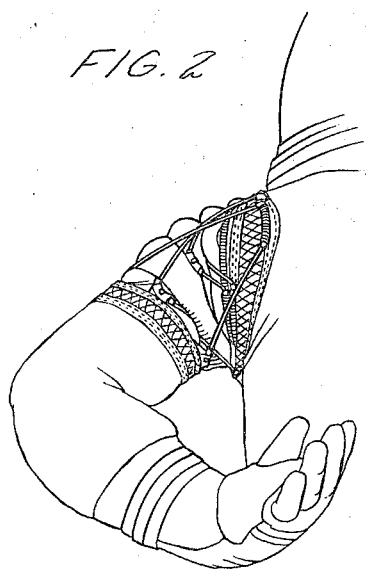
FIGURE 2 shows the joint of FIGURE 1 in another position.

Cord 42 passes through ferrules, or guide members 50 and 52 which are attached on opposite sides of the second convolute roots. Turnaround tubes, or guides, 54 and 56 which are attached at the base of the joint guide the cord around the joint to the opposite sides. These turnaround tubes are cut and positioned so that the angle between the cord 42 as it enters and leaves ferrule 50 is much less than the angle between the cord 42 as it enters and leaves ferrule 52 on the opposite side. Since the tension in the cord when the suit is inflated will be the same throughout the length of the cord, except for frictional effects caused by the turnaround tubes, this difference in angle means that the action of the restraint cord on ferrule 50 is different than the action of the restraint cord on ferrule 52. The components of the tension acting in a direction to collapse the joint at ferrule 50 are greater than the components acting the same way at ferrule 52. Restraint cord 44 is similarly attached to the first convolute root although the angles may not be exactly the same. Spaced approximately 90° from this are the restraint cords 46 and 48. Cord 46 is attached to the ferrules 58 and 60 on the second convolute root while cord 48 passes through ferrules 62 and 64 on the first convolute root. As in the case of cords 42 and 46 the angles between the portions of the cord passing through the ferrules on one side of the joint are much greater than the angles the cords make at the other side of the joint. For the application of this joint to a shoulder the small angles are orientated with respect to the torso so as to be on the down and forward portion of the arm scye opening in the torso portion of the suit. One advantage of this lacing configuration is that there is a tendency for the convolute roots to "slip" downward as the subject's arm is lowered. This is shown somewhat in FIGURE 2. This downward slippage or reorientation of the convolutes prevents bunching up of the fabric under the armpits of the wearer and allows the subject to let his arms hang down alongside his torso. This effect is caused primarily by the fact that there are unequal cord tension components acting in planes which are roughly parallel to the plane of the base of the joint. This difference in components is illustrated in FIGURE 7 for cord 42. Although this cord is not in the plane of the paper as shown in FIGURE 7 it will be apparent that the component shown by arrow 68 on one side of the joint tending to cause slippage is greater than the component on the other side of the joint indicated by the arrow 70.

This joint is designed to put a bias on the movement of the joint to provide easy movement in the range within which the shoulder joint of a human normally moves. The joint is basically symmetrical except for the cord restraint system, and if a symmetrical system were used on this joint the joint would have equal movement on any side of its neutral axis. This would mean that if a joint were sewn into a garment and the neutral axis was perpendicular to the arm side opening of the torso portion of the suit the shoulder would have the ability to move as far in the upward direction as it could in the down and as far in the rearward direction as it would in the forward direction. Since the human shoulder joint cannot be bent as far back as it can be moved forward and since normally the arms are held in a downward position it is preferable to bias the joint so as to place its mobility range more to the downward and forward direction. In other words, what the design of this joint attempts to do is to place the available motion where it corresponds to the motion of a human joint by placing a bias on the joint through the different angles which the restraint cords assume with respect to the convolute guide members or ferrules. The effect is to place the available mobility of the joint where it will do the most good.

Although our invention is shown embodied in a shoulder joint it can be utilized in any cord restraint joint in which it is desirable to bias the movement of the joint in particular directions.

We claim:
1. An omnidirectional joint for pressurized suits comprising:
   a flexible gas impervious tubular member for enclosing a human joint;
   first and second cord guide means attached to the opposite outside surface of the tubular member at one axial position;
   third and fourth cord guide means attached to the outside surface of the tubular member at a second axial position;
   a continuous restraint cord laced between all said guide means, said cord forming a path through said first, third, second, and fourth cord guide means as it circumscribes the tube; and
   the guide members being sized and positioned so that the angle formed between the sections of the cord on either side of the first guide means is substantially greater than the angle formed between the sections of the cord on either side of the second guide means.

References Cited

FOREIGN PATENTS 977,172  12/1964  Great Britain.

VERLIN R. PENDEGRASS, Primary Examiner